INVENTORS
George W. Fyler
Arthur Goldsmith
BY
Foorman L. Mueller
Attorney

HIGH-FREQUENCY COUPLING CIRCUITS

INVENTORS
George W. Fyler
Arthur Goldsmith

BY Foorman L. Mueller
Attorney

Patented Feb. 24, 1953 2,629,822

UNITED STATES PATENT OFFICE 2,629,822

HIGH-FREQUENCY COUPLING CIRCUITS

George W. Fyler, Lombard, and Arthur Goldsmith, Chicago, Ill., assignors to Motorola, Inc., a corporation of Illinois Application January 31, 1947, Serial No. 725,662

2 Claims. (Cl. 250—20)

This invention relates generally to high frequency coupling circuits and more particularly to coupling of the tuned circuits of television receivers.

In prior television systems, the gain of the system has been reduced because of inefficient coupling circuits for coupling the various stages of the receiver. This has been due to a large extent to the fact that television signal covers a relatively wide band and this entire band must be amplified and detected in order to provide a television picture having high definition. In television systems in which the same intermediate frequency amplifier is used for both video and audio signals, a band approximately #4 mc. wide is required for the video signals, and as the audio carrier wave differs from the video wave by 4.5 mc. a total frequency band of approximately 5 mc. at ½ voltage response is required in the detector coupling circuit. In order to provide such a wide intermediate frequency band and at the same time provide high gain, the coupling between the intermediate frequency amplifier and the detector must be very carefully selected. When using a crystal or diode detector and the detector load circuit has low impedance, special arrangements must be made in order to match efficiently the detector load with the intermediate frequency amplifier. This problem has been solved previously by the provision of a step-down transformer which, although giving the proper match, is very inefficient as the transformer has high impedance to the high frequency harmonic currents developed during the detection action. This same problem occurs in the coupling of the radio frequency amplifier to the converter as the radio frequency amplifier output is of relatively high impedance and the converter input is of relatively low impedance.

Another difficulty experienced in detectors for television receivers has been that the video amplifier to which the signals are applied by the detector develops an appreciable contact potential. In a directly coupled detector circuit this contact potential develops a biasing potential across the load resistor of the detecting element (diode or crystal). This potential tends to bias the crystal thereby reducing the detection efficiency on weak signals or at low amplitudes during modulation.

It is, therefore, an object of the present invention to provide a simple highly efficient circuit for coupling the various stages of a television receiver.

A further object of this invention is to provide a detector coupling circuit which forms an optimum output impedance for the intermediate frequency amplifier and also provides a low impedance path for harmonic voltages resulting from the detection providing high detection efficiency.

A still further object of this invention is to provide a detector circuit for a television receiver having such characteristics that the intermediate frequency amplifier and the video amplifier of the receiver are coupled thereby to provide a system having high gain.

A feature of this invention is the provision of a television receiver in which the radio frequency amplifier is coupled to the converter by a small condenser so that the low impedance of the converter does not cut down the gain of the radio frequency amplifier.

Another feature of this invention is the provision of a television receiver having an intermediate frequency amplifier and a crystal detector which is coupled to the amplifier by a condenser to provide an optimum load for the intermediate frequency amplifier, said condenser cooperating with other circuit elements to provide a low impedance path for harmonic voltages developed by the detector.

A further feature of this invention is the provision of a television receiver having a detector circuit including rectifying means and a load impedance, the load impedance being coupled to a video amplifier through a resistance capacitance network which passes the direct current and video frequencies but absorbs a portion of the contact potential developed by the video amplifier.

A still further feature of this invention is the provision of a television receiver having an intermediate frequency amplifier which amplifies a video modulated carrier wave and an audio modulated carrier wave of higher frequency, and a crystal detector which is arranged to derive the video signal from the modulated wave and to heterodyne the video carrier wave and the audio carrier wave to provide an audio modulated carrier wave of lower frequency, the detector being coupled to the amplifier by a small condenser.

Further objects, features and advantages of the present invention will be apparent from a consideration of the following specification taken in connection with the accompanying drawings in which.

Figure 1:
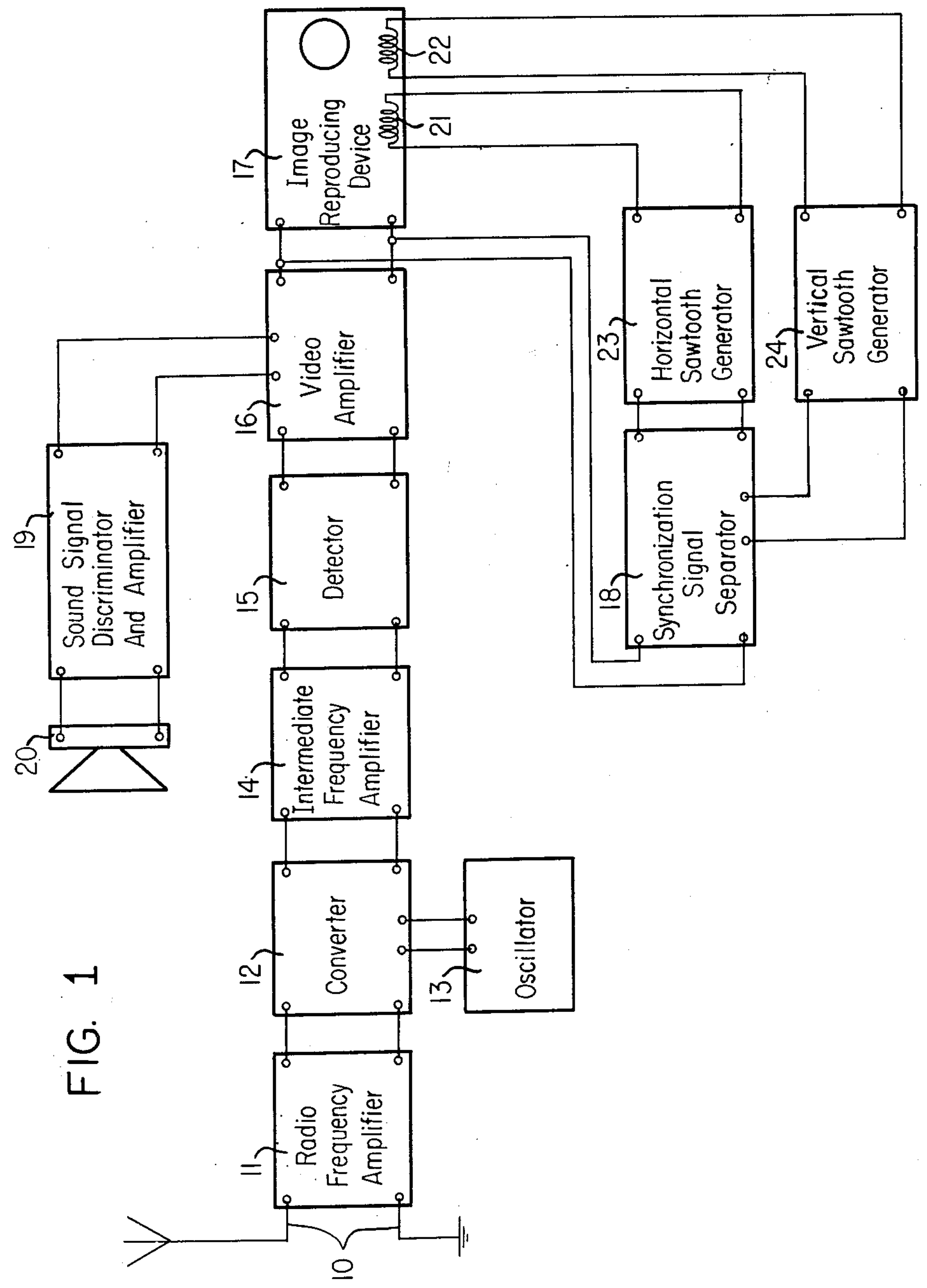
Fig. 1 is a block diagram illustrating a system in which the invention is applicable.

In practicing the invention we provide a television receiver including a radio frequency amplifier having a plate circuit adapted to be tuned to the various carrier frequencies to be received and being of relatively high impedance. The high impedance circuit of the radio frequency amplifier is coupled to a relatively low impedance input of a converter by a small condenser so that the effective input resistance of the converter is increased. The converter output is applied to an intermediate frequency amplifier which is adapted to amplify the video modulated intermediate frequency signal and also the audio modulated intermediate frequency signal. A detector circuit including a crystal detector and a load impedance is coupled to the intermediate frequency amplifier by a relatively small condenser. This condenser, in addition to providing an optimum match between the final amplifier tube and the crystal detector, also provides a low impedance path for the harmonic frequencies developed during the detection action. The voltage developed across the detector load which includes the video signals and the audio modulated carrier signal which has been heterodyned in the detector to a frequency of 4.5 mc. is applied to the video amplifier of the television receiver for further amplification. This voltage is applied to the video amplifier through a circuit including a condenser and resistor in parallel, the condenser being provided for passing the video frequencies and the resistor being provided to absorb a portion of the contact potential developed by the video amplifier to prevent biasing of the crystal detector.

Referring now more particularly to the drawings, there is illustrated a television receiver including an antenna-ground system 10 for intercepting a complex wave including carrier modulated video and audio signals and for applying them to radio frequency amplifier 11 wherein signals of predetermined frequencies are selected and amplified. The desired signals are converted into carrier waves of intermediate frequency by first detector or converter 12 which heterodynes the incoming waves with waves produced by local oscillator 13. The intermediate frequency waves are applied to intermediate frequency amplifier 14 wherein the signals are further selected and amplified. The video signals are derived from the video modulated carrier wave by second detector 15 which also functions to heterodyne the intermediate frequency video modulated carrier and the intermediate frequency audio carrier waves to provide an audio modulated carrier wave of relatively low frequency. In standard television systems the resulting audio modulated carrier wave will have a center frequency of 4.5 mc. The video and audio signals are thereafter applied to video amplifier 16 wherein these signals are amplified and separated, with the video signals being applied to the image reproducing device 17 and synchronization signal separator 18, and the audio modulated carrier wave being applied to the sound signal discriminator and amplifier 19. The frequency modulated audio signals are converted to amplitude modulated signals in the sound signal discriminator and amplifier 19 and after amplification are applied to sound reproducing unit 20.

The video signals applied to the image reproducing device 17 are used to modulate the image reproducing beam thereof. Deflecting coils or plates 21 and 22 are provided in the image reproducing device for causing the modulated beam to scan a rectilinear pattern on a screen thereby reconstructing the transmitted image. For providing scanning currents or voltages for the deflecting coils 21 and 22, horizontal sawtooth generator 23 and vertical sawtooth generator 24 respectively are provided. As is well known the television video signal is a composite signal including horizontal and vertical synchronization signals as well as signals representing the picture transmitted. The synchronization signal separator 18 removes the horizontal and vertical synchronization signals from the composite video signal and amplifies and separates these signals which are then applied to the horizontal and vertical sawtooth generators for controlling the deflecting currents provided thereby.

The present invention relates to improved circuits for coupling the various stages of the television receiver to improve the efficiency thereof. Specifically, circuits for coupling the radio frequency amplifier and the converter, the intermediate frequency amplifier and the detector, and the detector and the video amplifier are disclosed. Accordingly, the various other units will not be described in detail except insofar as is necessary for describing the action of the improved coupling circuits in accordance with the invention.

Before referring specifically to the coupling circuits in accordance with the invention, it is well to consider the type of signals with which the circuits are concerned. The video and audio signals received are imposed on carrier waves of different frequencies. As previously stated, the audio carrier wave is 4.5 mc. higher than the video carrier. Reduction of the radio frequencies in the converter 12 to intermediate frequencies does not change the general character of the signal but reduces the frequencies of the carriers. That is, the signal applied to the intermediate frequency amplifier is a complex signal including a video modulated carrier wave and an audio modulated carrier wave. As the oscillator frequency is above the frequency of the received signal, the intermediate frequency audio wave is of lower frequency than the intermediate frequency video wave. As previously pointed out, to retain all the intelligence on both the waves, it is necessary that a band of approximately 5 mc. be amplified by the radio frequency amplifier and the intermediate frequency amplifier. The use of a common intermediate frequency for both video and audio signals together with means for detecting and separating the signals is disclosed in application Serial No. 676,651 of George W. Fyler which matured into U. S. Patent 2,498,488 on February 21, 1950 for a Television Receiver circuit filed June 14, 1946.

Figure 2:
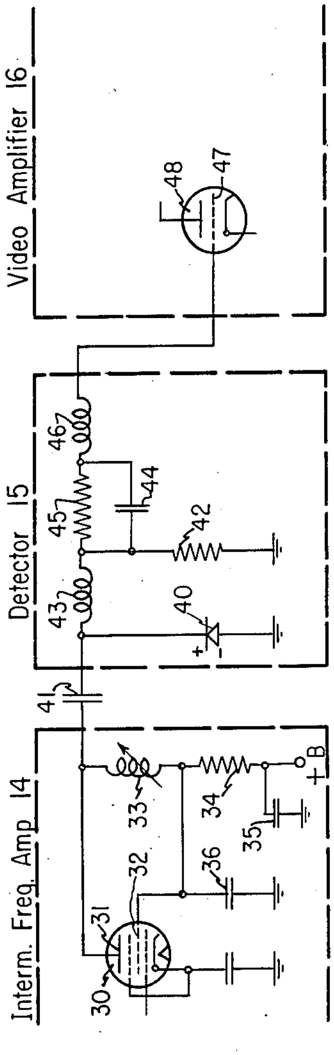
Fig. 2 illustrates a system for coupling the intermediate frequency amplifier to the detector.

Referring now more particularly to the second detector 15 and the coupling thereof to intermediate frequency amplifier 14, reference is made to Fig. 2 in which the intermediate frequency amplifier 14 is illustrated as including a pentode tube 30 including a plate 31 and a screen grid 32 which are coupled through variable inductance 33 which tunes the output circuit for amplification of the desired band of frequencies. Voltage is applied to the screen grid and plate from the +B power supply through resistor 34, condensers 35 and 36 being provided for bypassing the high frequency. The detector 15 includes rectifying means as, for example, a crystal 40 which is coupled to the output of the intermediate frequency amplifier 14 by condenser 41, the resistor 42 and inductance 43 forming a load for said rectifying means. Inductance 43 is an intermediate frequency choke having an inductance much larger than inductance 33.

For applying the signal developed across resistor 42 to the video amplifier 16, a circuit including condenser 44 and resistor 45 in parallel and both in series with inductance 46 is included. This signal applies the signal developed across resistor 42 to the grid 47 of amplifier tube 48 of the video amplifier 16. It is well known that contact potential will be produced on the grid 47 which when applied to resistor 42 will tend to negatively bias off the crystal for low level detection. By making the resistor 45 large compared with resistor 42 this potential will appear principally across resistor 45 so that resistor 42 and the action of the crystal will be substantially unaffected thereby. The value of condenser 44 is such that the video and audio signals will be passed thereby. A resistor 45 of at least 100,000 ohms and a condenser 44 in the order of .05 microfarad have been found to be satisfactory in a particular application.

Referring now to the operation of the detector circuit, it is seen that the tuned inductance 33, detector 40, condenser 41, load resistor 42 and inductance 43 form the output load of the intermediate frequency amplifier tube 30. Accordingly, the characteristic of the intermediate frequency amplifier will be effected by the values of the detector circuit, particularly the values of condenser 41 and resistor 42. The inductance 43 presents a high impedance to the intermediate frequency carrier waves and is also effective to smoothen somewhat the video signals passed thereby. Further, the resistor 42 must be of a proper value to form a suitable load impedance for the crystal detector 40 so as to pass uniformly the desired frequency range after detection. Therefore, it is seen that the value of resistor 42 is fixed within relatively narrow limits and condenser 41 alone may be chosen so that the band width and gain of the intermediate frequency amplifier 14 are optimum for the signals to be amplified thereby. In circuits tested it has been found that a condenser of the order of 6 micromicrofarads provides best results. This is to be contrasted with prior couplings in which condensers of the order of 100 micromicrofarads or larger were used. Further, it will be seen that a path for harmonic voltages developed during detection is provided through a crystal detector 40, condenser 41, from plate 31 to screen grid 32 of tube 30, and through condenser 36 to ground. As the harmonic voltages are of very high frequency, by proper selection of the value of condensers 36 and 41, a low impedance path can be provided for these harmonic frequencies. This tends to increase the efficiency of the detector by a very large factor.

The circuit for applying the voltage developed by the detector across load resistor 42 to the video amplifier 16 is arranged to prevent alternating current coupling of the video amplifier and applies a true D. C. signal including the video component of the video frequency amplifier. Condenser 44 is chosen of such value that the video signal is passed thereby. The function of resistor 45 is to reduce the effect of the contact potential, which will be developed by video amplifier 16, on the crystal detector circuit. Connection of the load resistor 42 directly to the video amplifier will necessarily cause the contact potential to be developed across resistor 42 with the result that the crystal 40 will be biased in a manner to reduce the efficiency thereof. By making resistor 45 large with respect to resistor 42, most of the contact potential will be developed across the resistor 45 thereby eliminating the effect of the contact potential on the detector circuit. The arrangement whereby resistor 45 and condenser 44 prevent biasing off of the detector 40 is particularly important in the circuit shown wherein the detector functions to convert the intermediate frequency audio signals to a low frequency (4.5 mc.) audio modulated wave. As previously stated, the low frequency audio wave is produced by heterodyning of the intermediate frequency audio wave with the intermediate frequency video wave which, of course, cannot take place if there is no intermediate frequency video wave. Biasing off of the detector has the same effect as the absence of a video intermediate frequency wave and, therefore, would prevent operation of the audio system.

Figure 3:
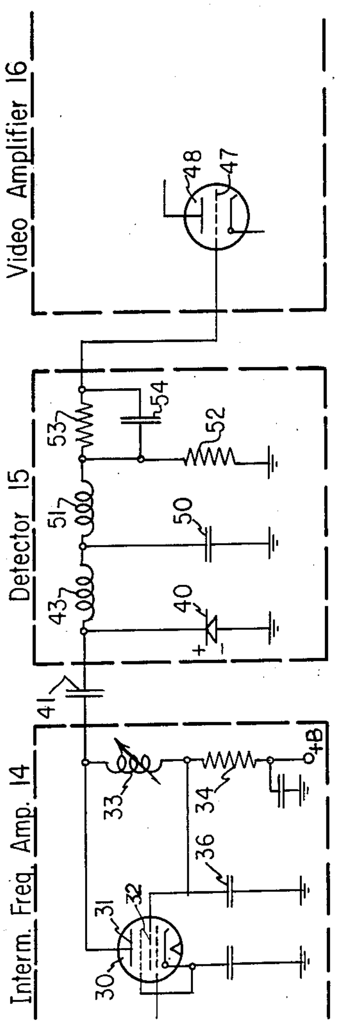
Fig. 3 illustrates a modification of the system of Fig. 2.

Fig. 3 illustrates an alternative detector circuit which is applicable in the system of Fig. 1, the circuit being generally similar to the detector circuit of Fig. 2. This detector circuit includes a low pass filter which serves to filter the intermediate frequencies and harmonics thereof from the signal applied to the video amplifier. This filter comprises the coupling condenser 41, inductances 43 and 51 and condenser 50. The detector load resistor 52 is coupled across the filter circuit and the voltage across this resistor is applied to the video amplifier through resistor 53 and condenser 54. Resistor 53 reduces the effect of the contact potential of the amplifier on the detector in the manner previously described. The circuit of Fig. 3 is particularly effective to prevent difficulty arising when the frequency of the channel being received is a harmonic of one of the intermediate frequencies used in the receiver.

Figure 4:
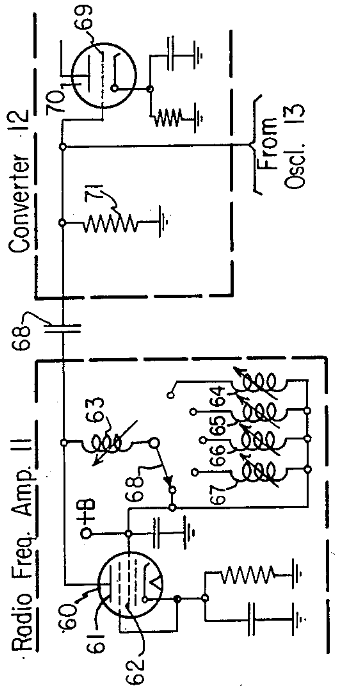
Fig. 4 illustrates a system for coupling the radio frequency amplifier to the converter.

The use of a very small condenser for coupling a high impedance output circuit to a low impedance input circuit such as illustrated in Figs. 2 and 3 for coupling an intermediate frequency amplifier to a second detector may also be advantageously used in coupling the radio frequency amplifier 11 to the first detector or converter 12. The detailed arrangement of such a circuit is illustrated in Fig. 4. Radio frequency amplifier 11 is illustrated as including a pentode tube 60 including a plate 61 and a screen grid 62 coupled by a tuned circuit including an inductance 63 and inductances 64, 65, 66 and 67 which may be selectively connected thereto by switch 68. It is apparent that the radio frequency amplifier may be tuned to a plurality of channels by the different settings of the switch by which the inductance 63 is connected directly between the plate and screen grid or is connected in series with one of the inductances 64 to 67. The frequency of the highest channel can be set by adjusting the inductance 63 and the additional channels can be set by adjusting the inductances 64 to 67, inclusive. The plate 61 of the tube 60 is coupled to converter 12, the plate being connected through condenser 68 to the grid 69 of the converter triode 70. The grid 69 is also connected to oscillator 13 and is biased by resistor 71.

Considering now the function of this circuit, the converter triode presents a low input impedance which is connected across the plate circuit of a radio frequency amplifier and which naturally tends to cut down the gain of the amplifier. By the connection of condenser 68 which is very small (of the order of 6 micro-microfarads) in series with the converter input, the effective resistance shunted across the plate circuit of the radio frequency amplifier is greatly increased. This provides higher Q in the plate circuit of the radio frequency amplifier and results in higher gain. Although the band width is decreased to some extent, the resulting product of gain and band width is substantially increased.

Great improvement has also been found to result from the detector and video amplifier coupling circuits in accordance with the invention. In general, crystals detectors have been coupled to the intermediate frequency amplifier by an auto transformer or coupled circuits in prior systems, in order to provide a high impedance into which the intermediate frequency amplifier may work. Such an arrangement, while providing the impedance match required, results in a high impedance circuit through which the harmonic currents must flow. This, of course, reduces the efficiency of the detector circuit. In the tests conducted improvement in the product of band width and gain as great as 9 to 1 were obtained by the use of the circuit in accordance with the invention as compared with the transformer coupled circuit. Also the use of the improved circuit for coupling the detector to the video amplifier results in improvements of the order of 2 to 1 in detector efficiency over circuits in which the load was coupled directly to the video amplifier. It is, therefore, seen that the improvements resulting from the circuits in accordance with the invention are major providing a gain equivalent to that of an additional stage of amplification.

The detector circuit disclosed is very simple and inexpensive and is particularly applicable to small sets where high gain with a minimum amount of equipment is required. The circuit is also applicable to other forms of detectors, such as diodes.

While we have described certain embodiments of the invention which are believed to be representative thereof, it is obvious that various changes and modifications can be made therein without departing from the intended scope of the invention as defined in the appended claims.

We claim:

1. In a television receiving system for reproducing an image from a video signal including a wide band of frequencies modulated on a carrier wave, the combination including, an amplifier stage for amplifying signals within a predetermined band of frequencies, said amplifier stage including an electron discharge valve having at least a cathode, a control grid, a screen grid, and a plate, and an output circuit including tuning means connected to said plate of said electron discharge valve to tune said stage, with the bandwidth of said stage varying with the load impedance connected thereto, detector means including, a pair of input electrodes and a load impedance, impedance matching condenser means directly connected between the plate of said amplifier stage and one of said input electrodes and forming a series circuit with said plate and said input electrodes, said condenser means being independent of said tuning means and with said input electrodes forming the load impedance of said stage, said condenser means having a small value of capacitance and providing with said input electrodes a load impedance such that said amplifier stage has high response over said predetermined band of frequencies, and connecting means providing a low impedance to high frequency currents interconnecting said screen grid of said electron discharge valve to the other one of said input electrodes of said detector means, so that a low impedance path for electric currents developed in said detector means during detection is provided through said condenser means, the screen grid to plate path of said valve and said connecting means.

2. In a television receiving system for reproducing an image from a video signal including a wide band of frequencies modulated on a carrier wave, the combination including, an amplifier stage for amplifying signals within a predetermined band of frequencies, said amplifier stage including an electron discharge valve having a plurality of electrodes including a plate electrode, and an output circuit including tuning means connected to said plate of said electron discharge valve to tune said stage, with the bandwidth of said stage varying with the load impedance connected thereto, a detector including a pair of input electrodes and a load impedance, impedance matching condenser means directly connected between the plate of said amplifier stage and one of said input electrodes and forming a series circuit with said plate and said input electrodes, said condenser means being independent of said tuning means and with said input electrodes forming the load impedance of said stage, said condenser means having a small value of capacitance and providing with said input electrodes a load impedance such that said amplifier stage has high response over said predetermined band of frequencies, and connecting means providing a low impedance to high frequency currents interconnecting an electrode of said electron discharge valve other than said plate electrodes to the other one of said input electrodes of said detector, so that a low impedance path for electric currents developed during detection is provided through said condenser means, the path within said valve between said plate electrode and said other electrode thereof, and through said connecting means.

GEORGE W. FYLER.
ARTHUR GOLDSMITH.

REFERENCES CITED

The following references are of record in the file of this patent:

UNITED STATES PATENTS

| Number | Name | Date |
|---|---|---|
| 1,319,989 | Brown | Oct. 28, 1919 |
| 1,547,154 | Hull | July 21, 1925 |
| 1,940,769 | Potter | Dec. 26, 1933 |
| 1,954,059 | Place | Apr. 10, 1934 |
| 1,956,964 | Schaffer | May 1, 1934 |
| 1,978,478 | Roosenstein | Oct. 30, 1934 |
| 2,032,914 | Crossley | Mar. 3, 1936 |
| 2,113,127 | Beers | Apr. 5, 1938 |
| 2,129,034 | Schlesinger | Sept. 6, 1938 |
| 2,157,170 | Grundmann | May 9, 1939 |

(Other references on following page)

UNITED STATES PATENTS

| Number | Name | Date |
|---|---|---|
| 2,183,741 | Grundmann | Dec. 19, 1939 |
| 2,210,497 | Percival | Aug. 6, 1940 |
| 2,216,454 | Pfister | Oct. 1, 1940 |
| 2,246,947 | Martinelli | June 24, 1941 |
| 2,363,299 | Dame | Nov. 21, 1944 |
| 2,378,944 | Ohl | June 26, 1945 |
| 2,408,420 | Ginzton | Oct. 1, 1946 |
| 2,448,908 | Parker | Sept. 7, 1948 |

FOREIGN PATENTS

| Number | Country | Date |
|---|---|---|
| 435,682 | Great Britain | Sept. 23, 1935 |
| 444,177 | Great Britain | Mar. 16, 1936 |
| 527,301 | Great Britain | Oct. 7, 1940 |
| 319,015 | Italy | July 27, 1934 |

| Number | Country | Date |
|---|---|---|
| 338,181 | Italy | Mar. 28, 1936 |
| 357,139 | Italy | Mar. 3, 1938 |

OTHER REFERENCES

V. T. Voltmeter by Rider, 1949, pages 25, 26, 55, 56.

Electronics, January 1947, pages 102–105.

Electronics, September 1945, pages 140–144, 218, 222, 226.

Radio News, March 1946, pages 35 to 37.

Service Manual for Radio Set SCR 268 (TM–1506) September 4, 1944, page 75.

Service Data Television Receiver Model—630 TS—page 45.

SCR–271–D, Instruction Manual, page 191, January 27, 1947.